Sept. 21, 1965        R. V. SMITH, JR        3,206,796
         ROTARY MACHINE FOR BREAKING BIVALVULAR
                    SHELLS FOR SHUCKING
Filed Aug. 12, 1963                          2 Sheets-Sheet 2

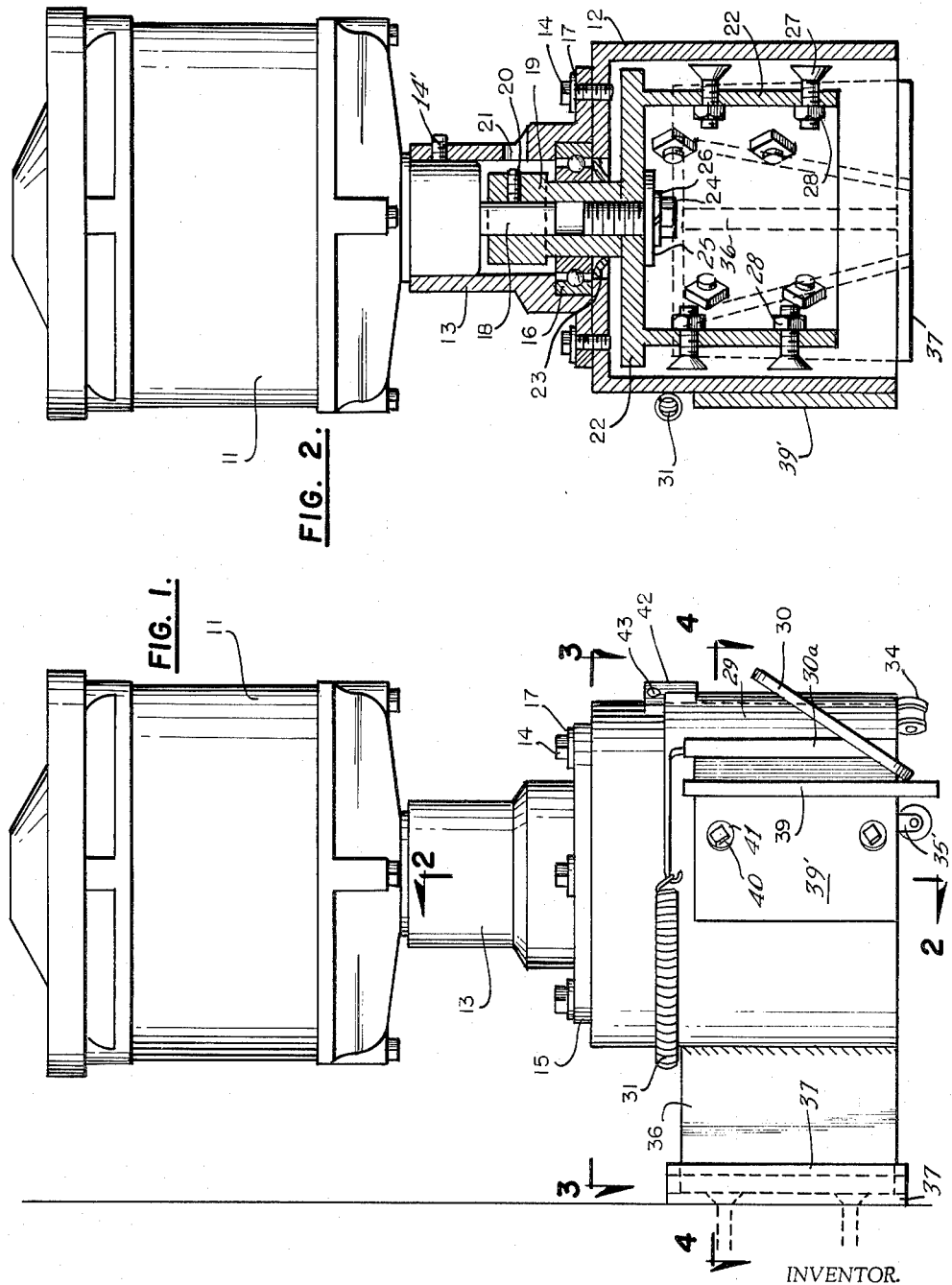

INVENTOR.
Roy Verne Smith, Jr.

BY

ATTORNEYS

United States Patent Office 3,206,796
Patented Sept. 21, 1965

3,206,796
ROTARY MACHINE FOR BREAKING BIVALVULAR SHELLS FOR SHUCKING
Roy V. Smith, Jr., P.O. Box 452, Apalachicola, Fla.
Filed Aug. 12, 1963, Ser. No. 301,454
8 Claims. (Cl. 17—9)

This invention relates to a rotatory machine for preparing oyster shells and the like for shucking.

In general use today, the method of preparing an oyster shell for subsequent shucking is by breaking off the edge of the bivalvular shell at a designated point thereon manually with hammer and break block. For example, the selected edge of the native oyster shell is placed on the chisel supported by an anvil on a break block. The butt, or large hinged end of the shell of the oyster is firmly grasped with one hand while the other hand of the shucker raises a hammer for the cleaving blow. Then the hammer is brought down, breaking the lip from the shell and coming to rest on the break block. The oyster meat is then knifed, or shucked from the shell completing the shucking of the oyster. This means of breaking oyster shells and the like is hazardous to the shucker's eyes because of flying shell fragments and the like. Also, the method is slow and tiring to the shucker.

To overcome the above difficulties and problems, a rotary machine was devised which occupies a very small amount of space and is substantially free from vibratory motions.

The present invention, in general, consists of a motor powered rotary cutter having projections thereon which coact with an oyster which is hand held against a stop with the stop being carried by a housing enclosing the rotary cutter. In use, the operator places a selected edge of the oyster shell against the stop, and gradually moves the oyster towards the cutter to break off the edge of the shell.

The primary object of this invention is to effectively break off the edge of an oyster shell while the oyster edge is within a housing thus capturing oyster fragments and juice, reducing the hazard to the eyes of the operator.

Another object of the invention is to provide a breaking machine which will break off the lip or shell edge for easy insertion of a knife blade to cut the eye or muscle of the oyster from the top shell to thus increase the shucking capacity of an operator for canning or preparing oysters for a raw bar or the like.

A further object of the invention is to provide a machine which substantially eliminates the arduous task of hand breaking, by hammer and anvil means, the edge of oyster shells preparatory to the shucking of the oyster from its native shell.

A still further object of the invention is to provide a rotary machine which will selectively break off the edge of an oyster shell with substantially no harmful vibrations to adjacent mounting structures, and thus reduce noise in the work room.

With these and other objects in view, the invention includes certain novel features hereinafter described with reference to the drawings which accompany and form a part of this specification.

FIGURE 1 shows a view in elevation of the assembled machine and motor mounted on a wall by means of a conventional tapered holder;

FIGURE 2 shows a sectional view of the machine taken on lines 2—2 of FIGURE 1 looking in the direction of the arrows;

FIGURE 3 shows a plan view of the machine taken on upper lines 3—3 of FIGURE 1 looking in the direction of the arrows;

FIGURE 4 is a plan sectional view of the machine taken on lower lines 4—4 of FIGURE 1 looking in the direction of the arrows and showing in dotted lines a retracted position of the hand rest and gate;

FIGURE 5 is a part elevational view of the machine showing hand rest and door channel with roller guide means therefor; and FIGURE 6 illustrates the conventional state of the art in which a hammer, anvil and breaker block is employed manually by an oyster shucker to break off the edge of the oyster shell previous to the subsequent shucking or scooping of the oyster from its shell.

Referring to the drawings, wherein like reference numerals designate like parts.

FIGURES 1 and 2 show the assembly of the new rotary machine for breaking oysters, operatively connected to an encased motor 11, of commercial manufacture. The rotary machine, in general, comprises housing 12 for rotary cutter head 22, drive shaft housing 13, motor shaft coupling 19, bearing means 16, gate or door means 29, gate or door spring 31, oyster stop or break bar 39, T-shaped wall mounting 36 and downwardly converging slide 37.

Motor 11 is secured to cutter housing 12 by means including shaft housing 13, threaded means 14, 14' and washer means 17.

Cutter head 22 is secured to shaft coupling 19 by washer 25, lock washer 26 and bolt means 24, as shown, in FIGURE 2.

Shaft coupling 19 is secured to motor shaft 18 by screw means 20, adjustment of which may be through aperture 21 in shaft housing 13.

Shaft coupling 19 rotates clockwise as viewed from above and is supported in shaft housing 13 by bearing means 16, the latter being supported by the top of the housing 12. Sealing means 23 are within a central aperture of the top of housing 12 as shown in FIGURE 2.

The rotary cutter means of the machine is cutter head 22 which comprises a plurality of staggered sharp and conical headed bolt means 27 which coact with an oyster shell as it is positioned against stop or break bar 39. The leading edge 39a of oyster stop 39 presents only a small radial clearance with the sharp headed bolt means 27, as is seen in FIGURE 4. Bolt means 27 are secured by lock nuts 28 to cutter head 22. Gate or door means 29 is slidable, and it carries therewith support means 30, and both 29 and 30 are supported on a plurality of roller means 34. The latter are mounted on horizontal bolt means 35, and bolts 35 are supported by vertical lugs 35' which extend downwardly from the base of housing 12. Gate or door means 29 is contained at its upper end by guide and keeper means 32, stationarily mounted on housing 12. The opening movement of gate means 29 is limited by engagement of the top of connector bar 30a with abutment means 42. Abutment 42 is secured by bolt or screw means 43 to cutter housing 12 just above guide or keeper means 32. The gate or door means is always closed by tension spring means 31 when not biased open by the operator's hand on hand rest 30. A closed oyster is partially positioned inside housing 12 and lightly contacting screws 27 when the operator is working with his hand resting on 30.

FIGURE 3 discloses in plan the attachment of gate spring 31 to housing 12 by bolt means 31a at one end of the spring. The other end of spring 31 is secured to gate means 29 by any suitable means. Spring 31 is always in tension during use. FIGURE 3 also discloses the attachment of gate guide means 32 to housing 12 by bolt means 33 and the attachment of abutment 42 to 12 by bolt 43. Cutter housing 12 may be secured by engagement of a T-shaped (in plan) mounting means 36, to a tapered recess wall support, the latter fastened by bolt means 37a in slide mounting means 37. This provides quick attachment and detachment of the machine to its wall support.

FIGURE 4 shows in section the structural arrangement of the cutting bolt heads 27a of bolt means 27, the latter being secured by lock nut means 28 to cutter head 22. There is only a small radial clearance between the bolt heads 27a and the leading edge 39a of the oyster stop or break bar 39. Bar 39 is mounted outside of housing 12 but terminates inside the housing. Its inner edge 39a is called a leading edge as the rotor teeth pass first by its sharp edge. Element 39 may be said to be oriented forwardly or in a leading direction. Cutter housing 12 is secured by mounting 36 to conventional slide means 37, the latter being attached by bolt means 37a to any suitable lateral support means as desired.

FIGURE 4 also shows in dotted lines a retracted or maximum open position of door 29. The door 29 and hand rest 30 are connected through connector bar 30a.

FIGURE 5 shows the structural arrangement of flange means 15, the drive shaft housing 13 being attached by bolt means 14, and washer means 17 to housing means 12. Likewise, gate guide 32 is attached by bolt means 33 to housing means 12. Gate means 29 is supported at its bottom edge by roller means 34 attached by bolt means 35 to lower edge of housing means 12, through vertical lugs 35′ as shown. Gate means 29 integrally carries hand rest means 30 through connector bar 30a.

Referring more specifically to FIGURES 1 and 4, oyster stop or break bar 39 is secured to an arcuate support plate 39′, and 39′ is secured by screw means 40 and lock washer means 41 to housing means 12.

FIGURE 6 shows the conventional means of preparing oysters for shucking in which a hammer 50 is in position to cleave the edge of an oyster shell 51 positioned against a chisel edge 52 held by an anvil 53.

To operate the machine, the motor is turned on by a conventional switch (not shown) and the operator, using hand rest 30, holds the edge of an oyster against the forward stop edge 39a and just within the path of the cutter head stop means 27a. The oyster may be thus firmly positioned either between the operator's hand and the oyster stop or break bar 39, or between the adjacent edge of door 29 at its intersection with connector bar 30a and the oyster stop or break bar 39. In either situation the lip portion of the oyster is facing the rotor, and a small opening is made in both lips of the shell by the revolving cutter head means 27a. The broken lipped oyster is then hand withdrawn from the machine and spring closing door 29 then closes the gap between break bar 39 and the leading edge of the door, thus protecting the operator from flying shell fragments. A knife is manually inserted in the lip opening and the oyster is then shucked as usual.

It should be understood, of course, that the foregoing disclosure relates to only a preferred embodiment of the invention and that it is intended to cover all changes and modifications of the invention herein chosen for the purposes of the disclosure, which do not constitute departures from the spirit and scope of the invention set forth in the appended claims.

I claim:
1. (1) A rotary machine for breaking bivalvular shells as oyster and the like comprising
  (2) an encased motor,
  (3) a rotatable cylindrical cutter head with a plurality of rows of curved edge projections mounted therealong, said head connected to and below said motor,
  (4) means to detachably mount said machine to a wall with the motor permanently above said head,
  (5) and an inwardly directed non-radial stop or break bar means aligned permanently parallel to the axis of the cutter head, and possessing an acute angled leading inner edge closely radially spaced from the cylindrical path of said on-coming projections,
  (6) whereby said edge cooperates with said cutter head to selectively break the lip edge portions of a shell which may be positioned against the inner edge of the bar and in the path of said cutter head projections.

2. (1) A machine as in claim 1 wherein
  (2) said projections comprise a plurality of sharp frusto-conical headed, flat top bolt means,
  (3) each protruding radially from the circumferentially perimeter of the cutter head, and with the base of the cone outermost and exposed, so that the sharp curved edges thus delineated may coact with said leading break bar edge.

3. (1) A machine as in claim 2 and including
  (2) a cylindrical housing means with a closed top, an open bottom, and a side wall opening with one edge adjacent said bar, said housing being coaxial with and surrounding said cutter head.
  (3) and a retractable curved gate mounted about the outer surface of said housing means and having one edge, in a closed position contacting a face of the stop or break bar, and with the same edge moving across said side opening as the gate retracts,
  (4) to thus provide a variable sized opening into and through the housing, to give access of variable sized shells from outside to said cutter head.

4. (1) A rotary machine for breaking the lips of bivalvular shells such as oysters and the like, comprising
  (2) an enclosed prime mover with an axial power shaft,
  (3) means to detachably mount said machine to a wall with the prime mover uppermost,
  (4) vertically elongated rotatable cutter head means coaxially connected to said prime mover,
  (5) a closed top, open bottom stationary housing means possessing a lower side opening with vertical edges, said housing attached to and supporting said prime mover and also surrounding but slightly out of contact with said cutter head means,
  (6) and a gate means concentric with said cutter head and adjacent and overlying said lower side opening, said gate means including hand rest means for retracting or opening the gate by an operator to allow part of a shell to pass through the lower opening and towards the cutter head.

5. (1) A machine as in claim 4 and including
  (2) a tension spring means with one end connected to the housing, an opposing end connected to said gate and a medial portion encircling a part of said housing,
  (3) for automatically closing said gate when the latter is not manually retracted.

6. (1) A machine as in claim 5 also including
  (2) roller means supported by the base of said housing and extending under the lower edge of said gate means
  (3) to completely support the latter in all of its operative movements.

7. (1) A rotary machine for breaking the lips of bivalvular shells, as oysters and the like, comprising,
  (2) a vertical axis enclosed electric motor,
  (3) a coaxial stationary housing with a closed top, a cylindrical side wall with a single side opening and an open bottom, connected to and supporting said motor,
  (4) a vertical stop or break bar means stationarily secured to said housing outwardly of an edge of said opening and also extending within said housing,
  (5) a vertically extending and housing-concentric rotary cutter head means having a periphery closely spaced from the portion of the bar within the housing, to present breaking coaction on shell lips directed therebetween,
  (6) wall support means for said machine emerging from said housing,
  (7) and an automatically closable gate means with hand rest means thereon, movable past said housing opening to selectively provide a variable sized passageway towards the cutter head for the admission of the lip edges of a shell for breaking between said cutter head periphery and said break bar.

8. (1) A machine as in claim 7 wherein automatic closing of the gate means is accomplished
   (2) by horizontal housing-encircling spring attached to both the housing and the gate,
   (3) and a plurality of equal height roller means contact and support said gate and said hand rest means to ease the travel of said gate means.

References Cited by the Examiner

UNITED STATES PATENTS

| 2,511,357 | 6/50 | Marty | 146—124 |
| 2,835,298 | 5/58 | Collins | 146—117 |

FOREIGN PATENTS 22,086   1913   Great Britain.

SAMUEL KOREN, *Primary Examiner.*

LUCIE H. LAUDENSLAGER, *Examiner.*